US010387370B2

(12) United States Patent
Shuster (10) Patent No.: US 10,387,370 B2
(45) Date of Patent: Aug. 20, 2019

(54) COLLECTING TEST RESULTS IN DIFFERENT FORMATS FOR STORAGE (71) Applicant: Red Hat Israel, Ltd., Ra'anana (IL)

(72) Inventor: Boaz Shuster, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 396 days.

(21) Appl. No.: 15/157,873

(22) Filed: May 18, 2016

(65) Prior Publication Data
US 2017/0337208 A1 Nov. 23, 2017

(51) Int. Cl.
G06F 11/34 (2006.01)
G06F 16/13 (2019.01)
G06F 16/14 (2019.01)
H04L 29/06 (2006.01)
H04L 29/08 (2006.01)
G06F 16/9535 (2019.01)

(52) U.S. Cl.
CPC .......... *G06F 16/13* (2019.01); *G06F 11/3476* (2013.01); *G06F 16/148* (2019.01); *G06F 16/9535* (2019.01); *H04L 67/06* (2013.01); *H04L 67/1097* (2013.01); *H04L 69/04* (2013.01)

(58) Field of Classification Search
CPC ............. G06F 11/2268; G06F 11/3476; G06F 11/0766; G06F 11/0769; G06F 11/0787; G06F 16/1734; G06F 2216/03; G06F 16/13; G06F 16/9535; G06F 16/148; H04L 69/04; H04L 67/1097; H04L 67/06
See application file for complete search history.

(56) References Cited

U.S. PATENT DOCUMENTS 7,155,514 B1 * 12/2006 Milford ................... H04L 41/06
709/225
8,874,755 B1 10/2014 Deklich et al.
8,903,943 B2 12/2014 Glaser et al.
9,274,935 B1 * 3/2016 Lachwani ........... G06F 11/3688
(Continued)

FOREIGN PATENT DOCUMENTS

CN 105138386 A 12/2015

OTHER PUBLICATIONS

*Jenkins Job Builder Documentation*, Mar. 21, 2016, https://media.readthedocs.org/pdf/jenkins-job-builder/latest/jenkins-job-builder.pdf.

(Continued)

Primary Examiner — David T. Brooks
(74) Attorney, Agent, or Firm — Haynes and Boone, LLP; Andrew Ehmke; Thuc Nguyen (57) ABSTRACT Systems and methods are provided for storing test results. An example method includes receiving a notification that a job has completed execution in a test execution server. The notification includes an identifier and a name of the job, and is sent from the test execution server. The method also includes retrieving a log file from the test execution server and determining a format of the log file. The log file includes a plurality of files storing a set of test results based on the execution of the job. The method further includes extracting, based on the format of the log file, the plurality of files from the log file. The method also includes storing one or more files of the plurality of files into a searchable repository that provides a full-text search engine.

20 Claims, 6 Drawing Sheets

(56) References Cited

U.S. PATENT DOCUMENTS

| | | | | |
|---|---|---|---|---|
| 2002/0078216 A1* | 6/2002 | Pankovcin | G06F 17/30569 | 709/230 |
| 2003/0051188 A1* | 3/2003 | Patil | G06F 11/3672 | 714/4.4 |
| 2004/0254919 A1* | 12/2004 | Giuseppini | G06F 17/30964 | |
| 2005/0027783 A1* | 2/2005 | Green | G06F 11/3476 | 709/200 |
| 2006/0069691 A1* | 3/2006 | Kawai | G06F 11/3068 | |
| 2006/0149788 A1* | 7/2006 | Bosloy | G06Q 10/06 | |
| 2006/0184529 A1* | 8/2006 | Berg | G06F 11/0709 | |
| 2009/0199047 A1* | 8/2009 | Vaitheeswaran | G06F 11/3409 | 714/47.2 |
| 2009/0313506 A1* | 12/2009 | Elizarov | G06F 11/3688 | 714/37 |
| 2011/0153616 A1* | 6/2011 | Torres | G06F 11/327 | 707/741 |
| 2012/0005542 A1* | 1/2012 | Petersen | G06F 11/0709 | 714/48 |
| 2013/0152047 A1* | 6/2013 | Moorthi | G06F 11/368 | 717/124 |
| 2013/0262487 A1* | 10/2013 | Yamashita | G06F 17/30115 | 707/755 |
| 2014/0123107 A1 | 5/2014 | Rajagopalan | | |
| 2014/0282031 A1* | 9/2014 | Hinterbichler | G06F 11/3656 | 715/738 |
| 2014/0358923 A1 | 12/2014 | Nunez et al. | | |
| 2015/0120755 A1 | 4/2015 | Burger et al. | | |
| 2015/0220605 A1* | 8/2015 | Syed | G06F 17/40 | 707/776 |
| 2015/0363304 A1 | 12/2015 | Nagamalla et al. | | |
| 2016/0026562 A1* | 1/2016 | Hwang | G06F 11/3688 | 714/38.1 |
| 2016/0196127 A1* | 7/2016 | Dey | G06F 8/65 | 717/172 |
| 2016/0299934 A1* | 10/2016 | Karandikar | G06F 17/30368 | |
| 2017/0024400 A1* | 1/2017 | Roshchin | G06F 11/3476 | |
| 2017/0270117 A1* | 9/2017 | Chen | G06F 16/116 | |

OTHER PUBLICATIONS

Hannah Inman, *Tasks and Warnings with Jenkins*, Feb. 2, 2012, https://www.cloudbees.com/blog/tasks-and-warnings-jenkins.

Veronica G. Vergara Larrea, Wayne Joubert, Chris Fuson, *Use of Continuous Integration Tools for Application Performance Monitoring*, Oak Ridge Leadership Computing Facility Oak Ridge National Laboratory Oak Ridge, TN, USA, https://cug.org/proceedings/cug2015_proceedings/includes/files/pap147.pdf.

* cited by examiner

COLLECTING TEST RESULTS IN DIFFERENT FORMATS FOR STORAGE

BACKGROUND

The present disclosure generally relates to storing test results, and more particularly to storing test results into a searchable repository.

Continuous integration is a software development practice where members of a team integrate their work. For example, each person may integrate daily, leading to multiple integrations per day. Each integration is verified by an automated build (including test) to detect integration errors as quickly as possible. A user may use a test execution server to build and test software projects continuously, making it easier for developers to integrate changes to the project and obtain a fresh build.

BRIEF SUMMARY

Methods, systems, and techniques for storing a log file associated with the execution of a job in a test execution server are provided.

An example method of storing test results includes receiving a notification that a job has completed execution in a test execution server. The notification includes an identifier and a name of the job. The notification is sent from the test execution server. The method also includes retrieving a log file from the test execution server, the log file including a plurality of files storing a set of test results based on the execution of the job. The method further includes determining a format of the log file. The method also includes extracting, based on the format of the log file, the plurality of files from the log file. The method further includes storing one or more files of the plurality of files into a searchable repository that provides a full-text search engine.

An example system for storing test results includes a test execution server that executes a job and stores a test result of the job into a log file. The system also includes a listener that receives a notification that a job has completed execution in the test execution server. The notification is sent from the test execution server and includes an identifier and a name of the job. The system further includes an extraction module that retrieves a log file from the test execution server, determines a format of the log file, and extracts, based on the format of the log file, a plurality of files from the log file. The log file includes the plurality of files storing a set of test results based on the execution of the job. The system also includes a logger that stores one or more files of the plurality of files into a search server that provides a full-text search engine.

An example non-transitory machine-readable medium includes a plurality of machine-readable instructions that when executed by one or more processors are adapted to cause the one or more processors to perform a method including: receiving a notification that a job has completed execution in a test execution server, the notification including an identifier and a name of the job, and the notification being sent from the test execution server; retrieving a log file from the test execution server, the log file including a plurality of files storing a set of test results based on the execution of the job; determining a format of the log file; extracting, based on the format of the log file, the plurality of files from the log file; and storing one or more files of the plurality of files into a searchable repository that provides a full-text search engine.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

Test execution servers may execute jobs. For each job executed by a test execution server, the test execution server may generate test results based on the execution of the job and store the test results into a log file. Typically, a test execution server generates a log file that is in a human-readable text format such as JavaScript Object Notation (JSON). JSON is an open-standard format that uses human-readable text to transmit data objects including attribute-value pairs. The test execution server may then send the log file to a searchable repository for storage. The searchable repository may provide a full-text search engine that is capable of parsing the text. A user may search the searchable repository for information regarding jobs and their corresponding test results. In some examples, test execution servers may generate log files in a format different from the text file format, and the searchable repository may be incapable of storing files that are not in the text file format. It may be desirable to collect these log files of different types and store them into the searchable repository.

The present disclose provides techniques to store log files in different formats into the searchable repository. Unless specifically stated otherwise, as apparent from the following discussion, it is appreciated that throughout the description, discussions utilizing terms such as "determining," "storing," "retrieving," "receiving," "sending," "extracting," "sending," "identifying," "discarding," "parsing," "collecting," "compressing," "decompressing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
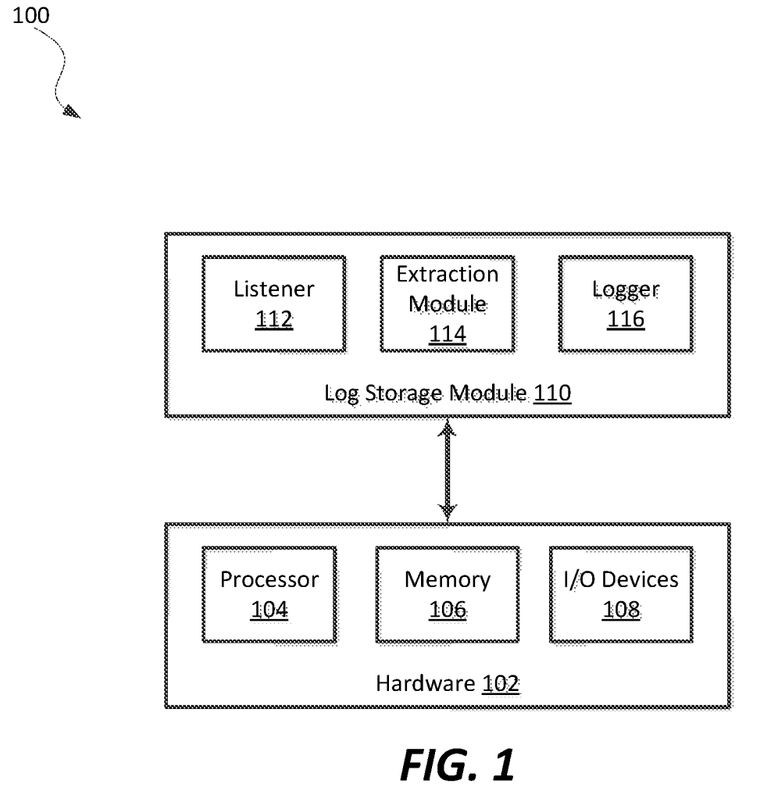
FIG. 1 is a diagram showing an example computing device for storing one or more tests results.

FIG. 1 is a diagram showing an example computer system 100 for storing one or more tests results. According to the present example, a physical system, such as computer system 100 includes hardware 102 such as processor 104 for executing software (e.g., machine-readable instructions) and using or updating data stored in memory 106. Hardware 102 may include more than one processor 104. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 106 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor, and various other software applications. Hardware 102 may also include other I/O devices 108.

Computer system 100 may be coupled over a network to one or more computing devices (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Computer system 100 may execute an application having one or more processes. A process is an executing instance of a program. Computer system 100 includes a log storage module 110 that interacts with one or more test execution servers (see FIG. 2). A test execution server executes one or more jobs and stores its corresponding test result into a log file. The test execution server may then store the log file into a test results database. A distributed system may include a plurality of test execution servers used to run tests on the same or different products. The plurality of test execution servers may generate log files of different types relative to each other. For example, a first test execution server may generate a log file of a text file format, a second test execution server may generate a log file of a zip file format, and a third test execution server may generate a log file of a tarball file format. It may be desirable to store log files of these different types into a searchable repository that provides a full-text search engine.

The searchable repository may provide an analysis system that enables a user to view the log files and test results. In an example, the searchable repository is SPLUNK® or ELASTIC SEARCH®. Trademarks are the properties of their respective owners. The full-text search engine may access row data stored in the searchable repository via an application programming interface (API) and search for and retrieve specific information stored in the searchable repository, and make the information readily available to a user. The present disclosure provides techniques to store log files of different types into a searchable repository that provides a full-text search engine. Additionally, it may also be desirable for the searchable repository to be decoupled from the one or more test execution servers executing the jobs.

In FIG. 1, log storage module 110 includes a listener 112, extraction module 114, and logger 116. Computer system 100 may be a dedicated host, and listener 112 may be a process running in the dedicated host. In an example, listener 112 listens on a specific port for messages from test execution servers. A test execution server may send to computer system 100 a notification that a job has completed execution in the test execution server. As discussed further below, in response to the notification, extraction module 114 may retrieve a log file storing test results based on the execution of the job. Extraction module 114 may determine a format of the retrieved log file. If the log file is in the text file format, logger 116 stores the log file into the searchable repository. If the log file is not in the text file format, the log file may include a plurality of files. If the log file is not in the text file format, extraction module 114 extracts, based on the format of the log file, the plurality of files from the log file. In an example, the log file may be an archive file that includes more than one test result file. Additionally, logger 116 may store one or more files of the plurality of files included in the log file into the searchable repository.

Figure 2:
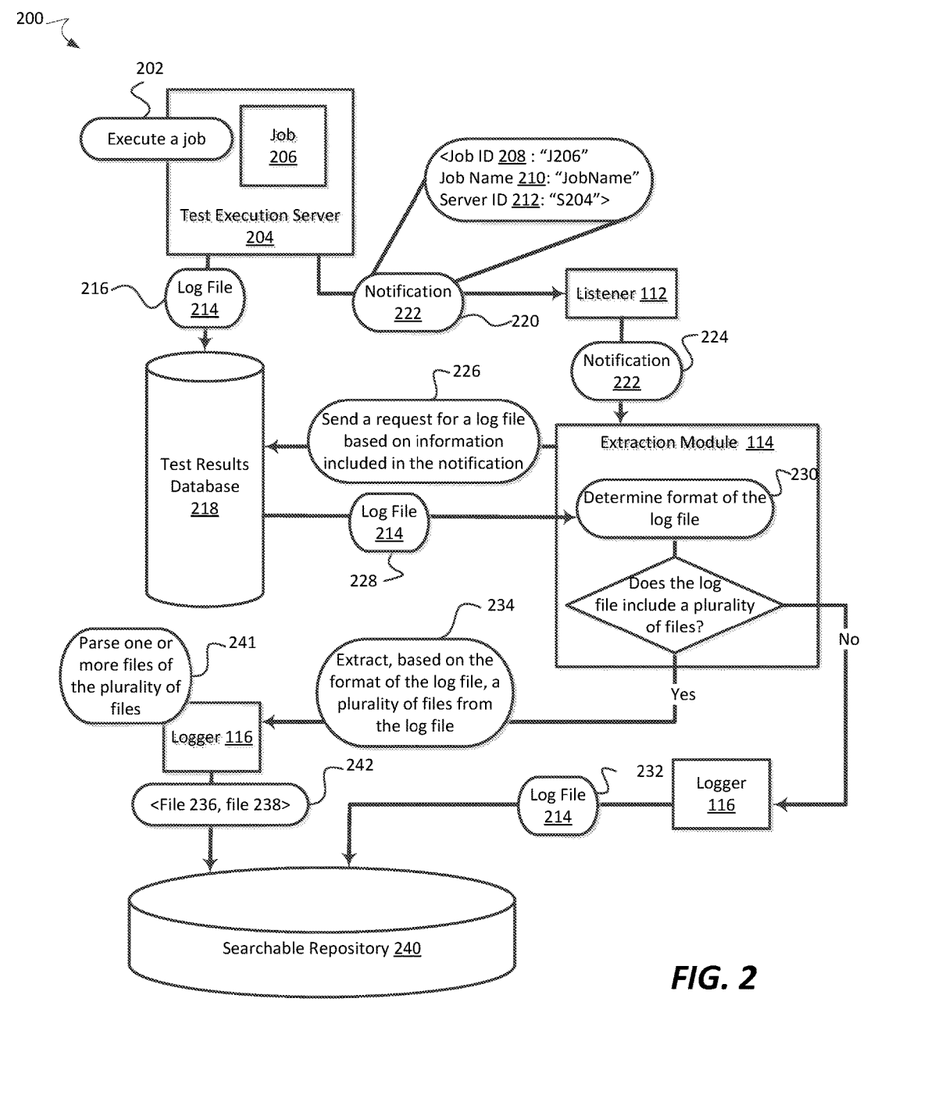
FIG. 2 is an example process flow illustrating the storage of one or more test results into a searchable repository.

FIG. 2 is an example process flow 200 illustrating the storage of one or more test results into a searchable repository. In FIG. 2, at an action 202, a test execution server 204 executes a job 206. Test execution server 204 may be an automation tool for continuous integration and delivery. Continuous integration is a software development practice where members of a team integrate their work frequently. For example, each person may integrate daily, leading to multiple integrations per day. Each integration is verified by an automated build (including test) to detect integration errors as quickly as possible. A user may use test execution server 204 to build and test software projects continuously, making it easier for developers to integrate changes to the project and obtain a fresh build. Additionally, test execution server 204 may run tests automatically. In some examples, test execution server 204 is a server-based system running in a servlet container such as APACHE TOMCAT®. In an example, test execution server 204 is a JENKINS® server that stores test results as artifacts into a test results database. In this example, JENKINS® may be packaged as a Web Application Archive (WAR) file and dropped into a server container. Although in FIG. 2, one test execution server is illustrated executing a job and storing test results of the job into test results database 218, it should be understood that more than one test execution server may perform these actions as described in relation to test execution server 204.

Test execution server 204 may be a web server that exposes log files through a Web browser (not shown) executing on computer system 100. Additionally, test execution server 204 may execute one or more jobs and generate test results based on the execution of the one or more jobs. Test execution server 204 may execute a build in an executor, keep track of the build statuses (e.g., failure or success), dependencies, and push the test results into various repositories. A build may be a job that is executed. A job may provide instructions on how to execute a particular task. In an example, a job may include instructions for a build, compiling software code, and/or generating a package.

In the example illustrated in FIG. 2, job 206 may be identifiable by a job identifier (ID) 208 "J206" and a job name 210 "JobName." Additionally, job 206 may also be associated with a server ID 212 "S204," which identifies the test execution server that executed the job. After test execution server 204 finishes executing job 206, test execution server 204 may generate a log file 214 including a set of test results based on the execution of job 206. A log file may include information about the job and its execution. For example, the log file may include a status of the execution (e.g., success or failure), builds that occurred based on the execution of the job, among other information.

A log file may come in many forms and be in one of many formats. For example, log file 214 may be compressed (e.g., by using gzip, bzip2, or lxz), may be an archive file (e.g., tarball or zip), text file, image file (e.g., jpeg, jpg, or gif), or binary file (e.g., exe or bin). In an example, log file 214 may include a plurality of text files storing a set of test results based on the execution of job 206. It may be difficult for logger 116 to store log files into the searchable repository because the searchable repository may only be capable of storing text files. Additionally, logger 116 may only know how to send text log files to the searchable repository and not know how to handle files that are not text files. It may be desirable for the log files to be stored in the searchable repository regardless of whether they are text files. It may also be desirable for the searchable repository to be decoupled from the one or more test execution servers executing the jobs.

At an action 216, test execution server 204 stores log file 214 into a test results database 218. At an action 220, test execution server 204 sends a notification 222 that job 206 has finished executing to computer system 100. Notification 222 may provide an indication that log file 214, which is based on the execution of job 206, is stored in test results database 218 and is ready to be retrieved. Notification 222 may be a JSON message including, among other job parameters, job 206's job ID and name, and the uniform resource locator (URL) of the test execution server in which the job executed. Test execution server 204 may use a protocol such as Web Book, Hypertext Transfer Protocol (HTTP), and/or HTTPS to send notification 222 to computer system 100. In the example illustrated in FIG. 2, notification 222 includes job ID 208 "J206," which identifies job 206, job name 210 "JobName," which is job 206's name, and server ID 212 "S204," which identifies test execution server 204. A job ID and name of a job along with the test execution server in which the job executed may provide computer system 100 within enough information to retrieve test results of the job from the appropriate test execution server.

Listener 112 may listen for one or more test execution servers. Listener 112 may receive notification 222. A user may specify to listener 112 which test execution servers to listen for or jobs to ignore. For example, a blacklist may specify a list of jobs to ignore. In this example, listener 112 may determine whether job 206 is specified in the blacklist. In response to a determination that job 206 is specified in the blacklist, listener 112 may discard notification 222. A user may request that a job be placed in the blacklist because the job does not produce information of interest to the user. Additionally, if the user specified a list of text execution servers to listen for, listener 112 may determine whether test execution server 204 is specified in this list. In response to a determination that test execution server 204 is not in the list of test execution servers to listen for, listener 112 may discard notification 222.

At an action 224, in response to a determination that job 206 is not specified in the list of jobs to ignore and/or test execution server is specified is in the list of test execution servers to listen for, listener 112 may pass notification 222 to extraction module 114. Accordingly, extraction module 114 becomes informed that a log file based on the execution of job 206 has finished executing and is stored in test results database 218. Extraction module 114 reads notification 222, which includes job 206's ID and name along with test execution server 204's server ID.

At an action 226, extraction module 114 sends a request for a log file based on information included in notification 222 to test results database 218. Test results database 218 may receive the request and search its records for a log file that was generated based on executing a job identified by job ID 208 "J206" and having job name 210 "JobName," where the job was executed in a test execution server identified by server ID 212 "S204." In an example, extraction module 114 sends a query to test results database 218, where the query selects the log file that is generated based on those aforementioned parameters. At an action 228, test results database 218 identifies log file 214 as being the requested log file and sends it to extraction module 114. Accordingly, extraction module 114 retrieves log file 214 from test results database 218. Extraction module 114 may download log file 214 from test results database 218.

At an action 230, extraction module 114 determines a format of log file 214. In an example, each file format may have a particular offset, and extraction module 114 may read an offset of a log file and determine, based on the offset, the format of the log file. In an example, extraction module 114 determines that a log file is of a particular type (e.g., GZIP file) by reading the first M characters of the log file and determining that the first M characters match the offset indicative of a file of that particular file type. In an example, a log file may be in the ZIP, GZIP, or tarball file format. In this example, the log file may include a plurality of text files, and a user may specify which files of the plurality of text files to store into the searchable repository. In an example, log file 214 is compressed, and extraction module 114 determines whether the log file is compressed. In response to a determination that log file 214 is compressed, extraction module 114 decompresses the log file. In an example, extraction module 114 uses a built-in library (e.g., PYTHON® library) to decompress the log file. In this example, extraction module 114 may invoke an API exposed by the library to decompress the log file.

At an action 232, if log file 214 does not include a plurality of files, logger 116 stores the log file into searchable repository 240. At an action 234, if log file 214 includes a plurality of files, extraction module 116 extracts, based on the format of the log file, the plurality of files from the log file. Extraction module 114 provides the plurality of files to logger 116. Logger 116 receives the plurality of files included in log file 214 and identifies the particular files for storing into searchable repository 240. The plurality of files may be text files that are included in the log file. In an example, the plurality of files includes file 236, file 238, and may include more that are not stored into searchable repository 240. A user may specify which file(s) she would like stored in searchable repository 240. At an action 241, logger 116 parses the text files that are to be stored in searchable repository 240.

At an action 242, logger 116 stores the appropriate text file(s) into searchable repository 240. Accordingly, individual files included in the plurality of files may be stored in searchable repository 240. In some examples, one or more files included log file 214 is not stored in searchable repository 240. Logger 116 may log the files included in the log file into a log report so that a user may easily ascertain the files that were included in the log file. In an example, searchable repository 240 provides a full-text search engine. Searchable repository 240 may provide a service that allows a user to collect, store, and aggregate test results. In some examples, logger 116 includes a data pipeline that processes logs and other event data from a variety of systems. In an example, logger 116 includes LOGSTASH®.

A test execution server may be limited in hard disk resources and may store a large amount of data in test results database 218 because of the vast amount of data that is generated in accordance with executing jobs. For example, each build may generate its own test results and take about 10 gigabits (GB) of memory. It may be desirable to save test result data temporarily and delete this data at a later point in time to make room for other data. In an example, after logger 116 stores the appropriate files into searchable repository 240 and logs which files were included in log file 214, logger 116 may send a message indicating that the appropriate files associated with job 206 have been saved in searchable repository 240 to test execution server 204. Test execution server 204 may then delete these files from test results database 218. In another example, test execution server 204 stores data for a threshold amount of time (e.g., one week). If the threshold amount of time elapses, test execution server 204 may delete the appropriate files associated with job 206 from test results database 218.

Figure 3:
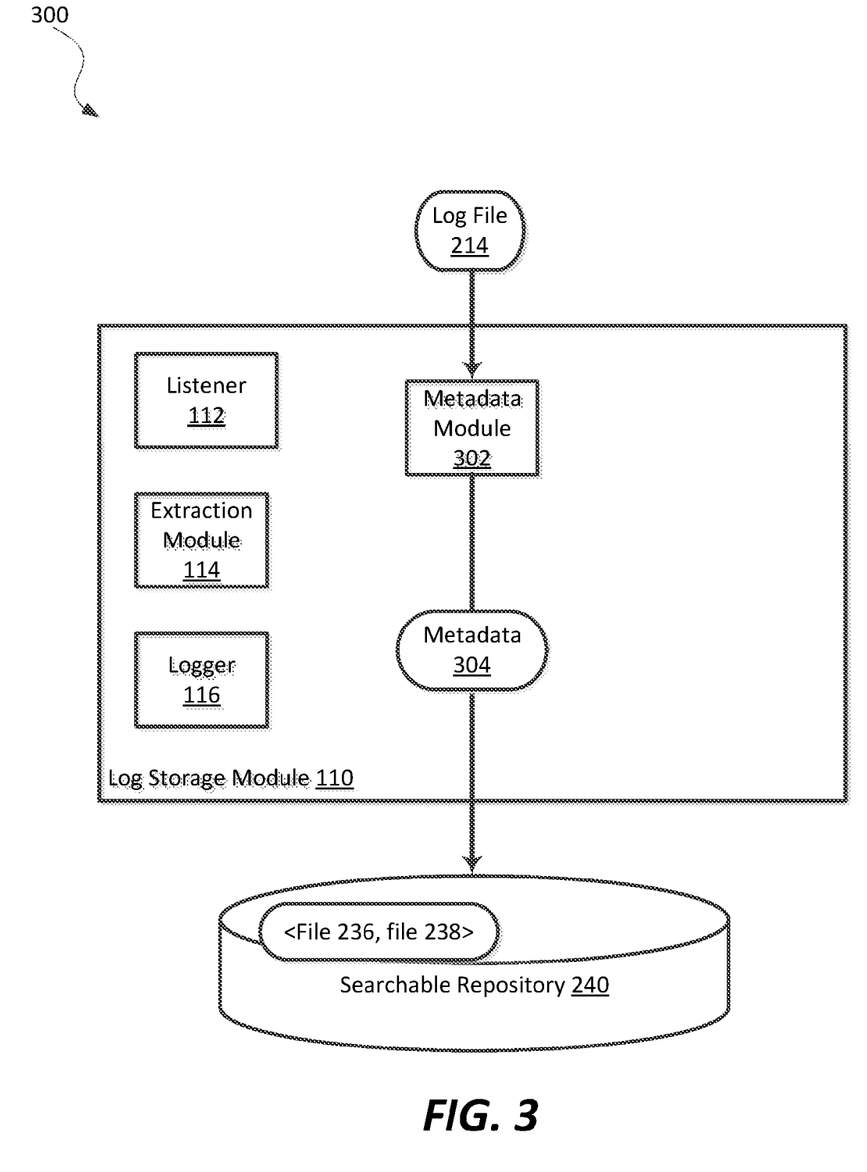
FIG. 3 is an example block diagram illustrating the storage of metadata associated with the execution of a job.

Test results may also be associated with metadata that provides additional information about the test results. FIG. 3 is an example block diagram 300 illustrating the storage of metadata associated with the execution of a job. In an example, log storage module 110 includes a metadata module 302 that stores metadata associated with a test result into searchable repository 240. Metadata module 302 may run in computer system 100 or in a computer system different from computer system 100. In some examples, metadata module 302 listens on a dedicated port for log files retrieved from test results database 218. In FIG. 3, metadata module 302 receives log file 214 and reads it. Metadata module 302 may identify metadata 304 associated with one or more test results in log file 214. Metadata module 302 may extract metadata 304 and associate it with one or more of files 236 and 238 (see FIG. 2). In an example, metadata module 302 invokes an API at test execution server to extract at least some or all of the metadata.

Metadata module 302 may parse one or more rows of data in log file 214 and create metadata based on the one or more rows of data. Logger 116 may collect metadata 304 based on the test results of executing job 206 and store the metadata corresponding to the log file into searchable repository 240. In an example, log file 214 includes a "job status" or "build status" field indicating whether job 206 or the associated build executed successfully or failed. In this example, metadata module 302 may extract this "job status" or "build status" information from log file 214 and store it as metadata into searchable repository 240. This metadata stored in the searchable repository may be used to filter particular jobs or fields. Accordingly, a user may better analyze and aggregate the test results using the metadata provided to have a better understanding of the bigger picture. In another example, metadata module 302 may store a link into searchable repository, and log storage module 110 may display the link on a display coupled to computer system 100. If the user selects the link, log storage module 110 may send a request to searchable repository 240 to view the full log files associated with the testing. In an example, the link may be a link to the build on test execution server 204.

Data stored in searchable repository 240 may be used to analyze and aggregate test result data. In an example, a user may create a real-time analytics dashboard using searchable repository 240. Searchable repository 240 may include a search that allows users to compute aggregations of their data. For example, a user with data associated with a social media website may create buckets for the number of posts per year, quarter, month, day, week, hour, or minute using a date histogram facet. Additionally, the search may be a powerful tool for data visualization. For example, KIBANA® provides a front-end interface that makes use of facets. KIBANA® may receive the results from searchable repository 240 and generate visual data (e.g., chart) that describes the data.

As discussed above and further emphasized here, FIGS. 1-3 are merely examples, which should not unduly limit the scope of the claims.

Figure 4:
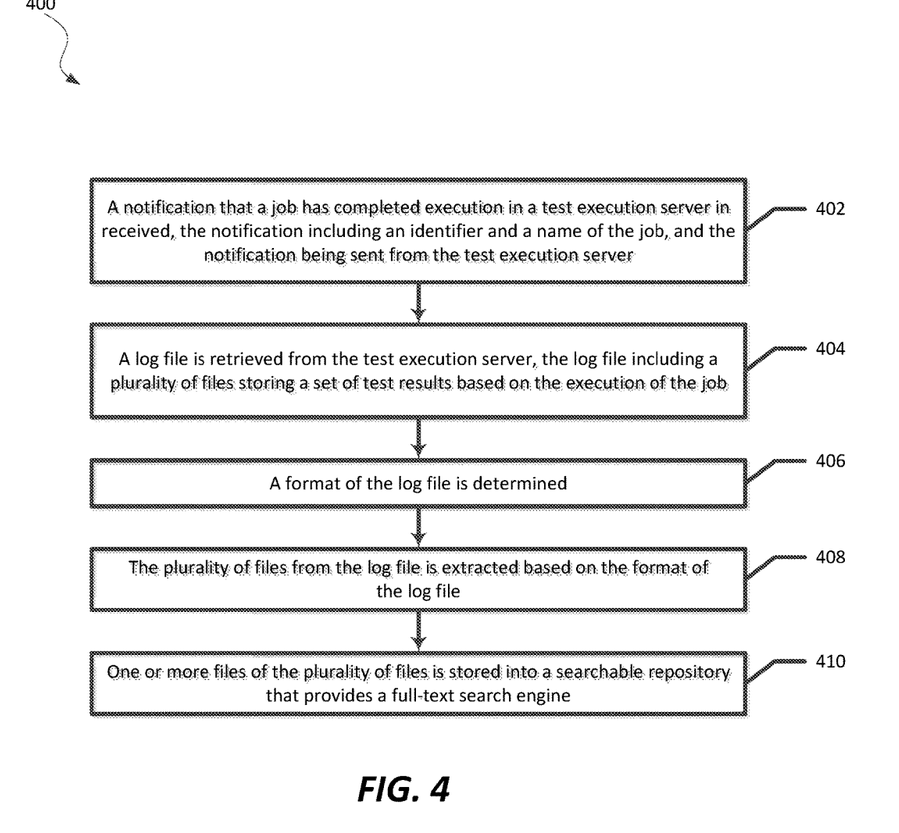
FIG. 4 is an example flowchart illustrating a method of storing one or more tests results.

FIG. 4 is an example flowchart illustrating a method 400 of storing test results. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 400 is performed by the system 100 illustrated in FIG. 1. For example, method 400 may be performed on computer system 100. In some examples, the order of the actions described below may also be performed according to alternative orderings. In yet other examples, additional actions may be added and actions that are described may be removed.

Method 400 includes blocks 402, 404, 406, 408, and 410. In a block 402, a notification that a job has completed execution in a test execution server in received, the notification including an identifier and a name of the job, and the notification being sent from the test execution server. In an example, listener 112 receives notification 222 that job 206 has completed execution in test execution server 204, where notification 222 includes a job ID 206, and job name 210, and is sent from test execution server 204. In a block 404, a log file is retrieved from the test execution server, the log file including a plurality of files storing a set of test results based on the execution of the job. In an example, extraction module 114 retrieves log file 214 from test execution server 204, where log file 214 includes a plurality of files storing a set of test results based on the execution of job 206. In a block 406, a format of the log file is determined. In an example, extraction module 114 determines a format of log file 214. In a block 408, the plurality of files from the log file is extracted based on the format of the log file. In an example, extraction module 114 extracts, based on the format of log file 214, the plurality of files from the log file. In a block 410, one or more files of the plurality of files is stored into a searchable repository that provides a full-text search engine. In an example, logger 116 stores one or more files of the plurality of files into searchable repository 240 that provides a full-text search engine.

It is also understood that additional processes may be performed before, during, or after blocks 402, 404, 406, 408, and/or 410 discussed above.

Figure 5:
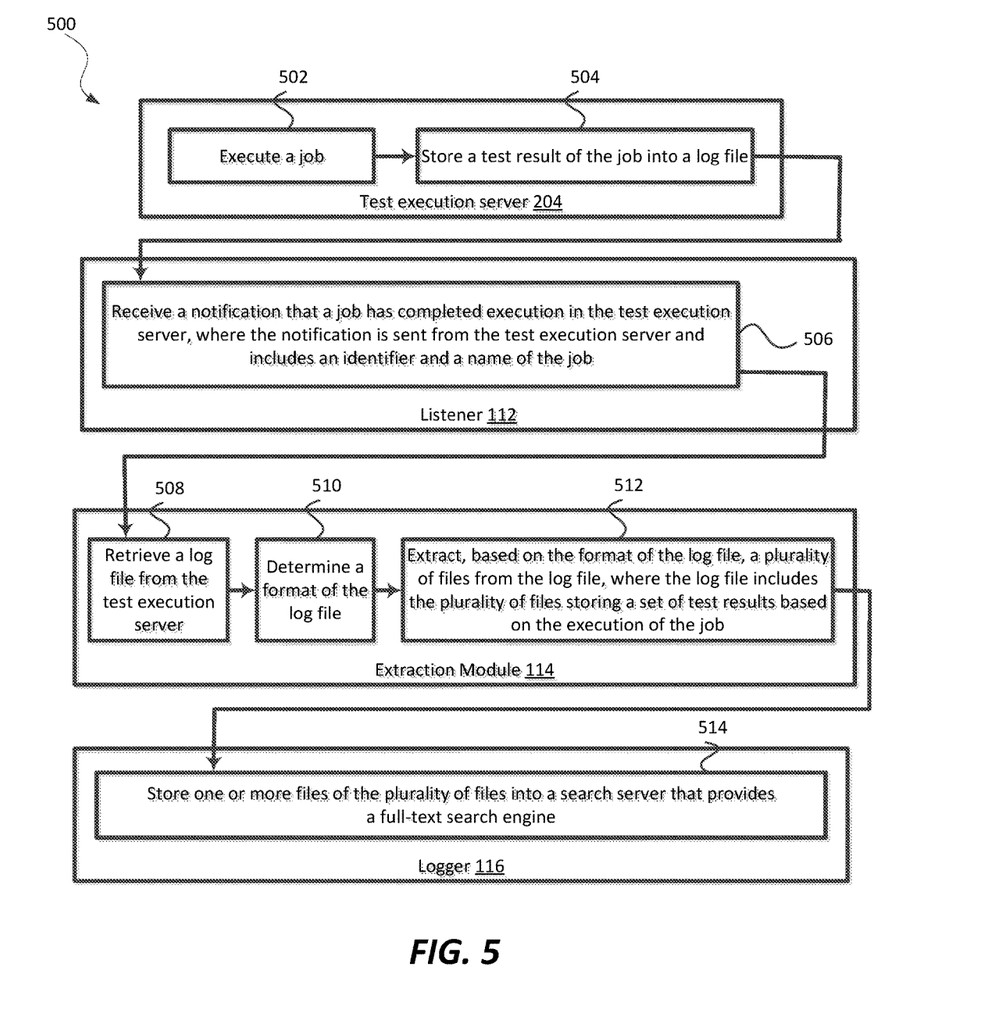
FIG. 5 is another example flowchart illustrating a method of storing one or more tests results.

FIG. 5 is another example flowchart illustrating a method 500 of storing one or more tests results. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by the system 100 illustrated in FIG. 1. For example, method 500 may be performed on computer system 100. In some examples, the order of the actions described below may also be performed according to alternative orderings. In yet other examples, additional actions may be added and actions that are described may be removed.

Method 500 includes blocks 502, 504, 506, 508, 510, 512, and 514. In block 502, test execution server 204 executes a job. In block 504, test execution server 204 stores a test result of the job into a log file. In block 506, listener 112 receives a notification that a job has completed execution in the test execution server, where the notification is sent from the test execution server and includes an identifier and a name of the job. In block 508, extraction module 114 retrieves a log file from the test execution server. In block 510, extraction module 114 determines a format of the log file. In block 512, extraction module 114 extracts, based on the format of the log file, a plurality of files from the log file, where the log file includes the plurality of files storing a set of test results based on the execution of the job. In block 514, logger stores one or more files of the plurality of files into a search server that provides a full-text search engine.

It is also understood that additional processes may be performed before, during, or after blocks 502, 504, 506, 508, 510, 512, and/or 514 discussed above.

Figure 6:
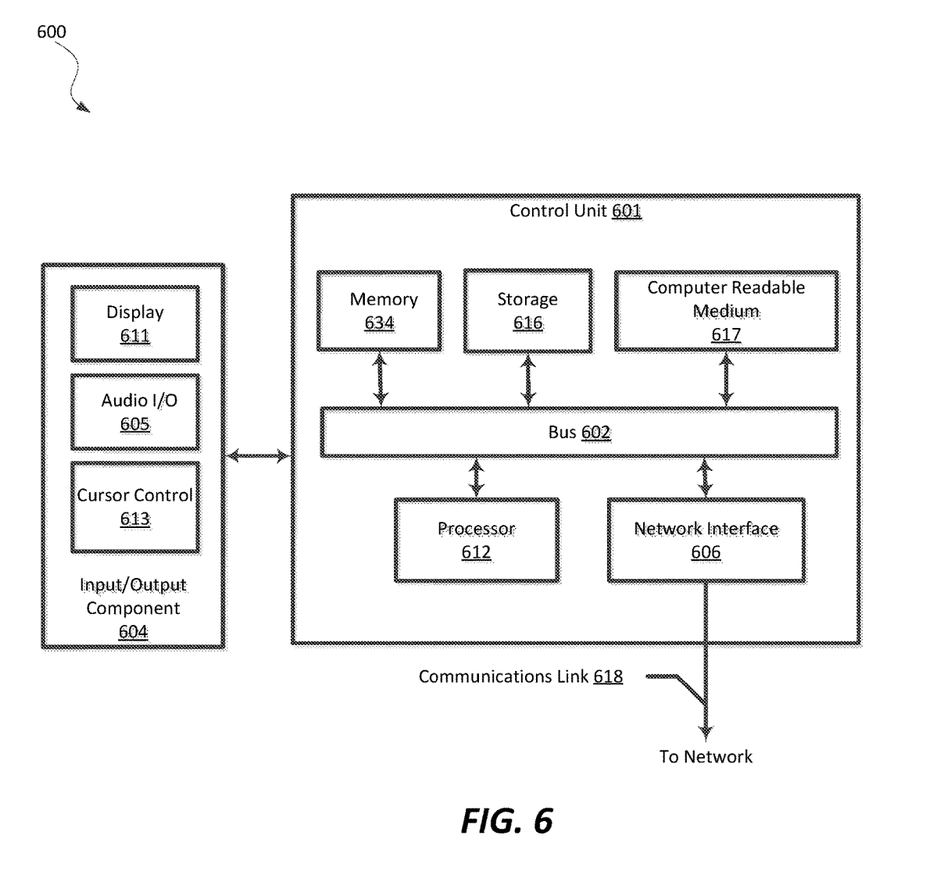
FIG. 6 is a block diagram illustrating a computing system suitable for implementing one or more examples of the present disclosure.

FIG. 6 is a block diagram illustrating a computing system 600 suitable for implementing one or more examples of the present disclosure. Components that are illustrated in computing system 600 may be included in system 100. In various implementations, computing system 600 may be a client or a server computing device. The client or server computing device may include one or more processors 104. The client or server computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computing system 600 may include a bus 602 or other communication mechanism for communicating information data, signals, and information between various components of the computer system. The components may include an input/output (I/O) component 604 that processes a user action, such as selecting keys from a keypad/keyboard, selecting one or more buttons or links, etc., and sends a corresponding signal to bus 604. I/O component 604 may also include an output component such as a display 611, and an input control such as a cursor control 613 (such as a keyboard, keypad, mouse, etc.). An audio I/O component 605 may also be included to allow a user to use voice for inputting information by converting audio signals into information signals. Audio I/O component 605 may allow the user to hear audio.

A transceiver or network interface 606 may transmit and receive signals between computing system 600 and other devices via a communications link 618 to a network. In an example, the transmission is wireless, although other transmission mediums and methods may also be suitable. Processor 104, which may be a micro-controller, digital signal processor (DSP), or other processing component, processes these various signals, such as for display on host machine 102 or transmission to other devices via the communications link. Processor 104 may also control transmission of information, such as cookies or IP addresses, to other devices.

Components of computing system 600 may also include a system memory component 634 (e.g., RAM), a static storage component 616 (e.g., ROM), and/or a computer readable medium 617 (e.g., disk drive). Computing system 600 performs specific operations by processor 104 and other components by executing one or more sequences of instructions contained in the system memory component (e.g., memory 634). Logic may be encoded in a computer readable medium, which may refer to any medium that participates in providing instructions to processor 104 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 400) to practice the present disclosure may be performed by computing system 600. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or actions, and/or separated into sub-steps, sub-blocks, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of storing test results, comprising:
   receiving a notification that a job has completed execution in a test execution server, the notification including an identifier and a name of the job, and the notification being sent from the test execution server;
   retrieving, based on the identifier and the name of the job, a log file from the test execution server, the log file including a plurality of files storing a set of test results based on the execution of the job, and the log file being in a format different from at least one file of the plurality of files;
   extracting, based on the format of the log file, a first set of text files from the log file;
   extracting, based on the format of the log file, a second set of files from the log file, the second set of files being different from text files;
   storing the first set of text files, but not the second set of files, into a searchable repository that provides a full-text search; and
   logging the first set of text files into a log report, the log report specifying files that have been stored into the searchable repository.

2. The method of claim 1, comprising:
   receiving a second notification that a second job has completed execution in a second test execution server, the second notification including a second identifier and a second name of the second job, and the second notification being sent from the second test execution server;
   retrieving, based on the second identifier and the second name of the second job, a second log file from the second test execution server, the second log file including a second plurality of files storing a second set of test results based on the execution of the second job;
   extracting, based on a second format of the second log file, the second plurality of files from the second log file, the first format being different from the second format; and
   storing one or more files of the second plurality of files into the searchable repository.

3. The method of claim 1, wherein receiving the log file includes in response to receiving the notification, downloading the log file from the test execution server.

4. The method of claim 1, further comprising:
   reading an offset of the log file; and
   determining, based on the offset, the format of the log file.

5. The method of claim 1, wherein receiving the notification includes receiving a JSON message.

6. The method of claim 1, further comprising:
   determining whether the job is specified in a blacklist; and
   in response to a determination that the job is specified in the blacklist, discarding the notification, wherein retrieving the log file, extracting the plurality of files, and storing the one or more files includes in response to a determination that the job is not in the blacklist, retrieving the log file, extracting the plurality of files, and storing the one or more files.

7. The method of claim 1, further comprising:
   parsing the log file;
   collecting metadata on the plurality of files included in the log file; and
   storing the metadata corresponding to the plurality of files into a search server, wherein the metadata is associated with the plurality of files.

8. The method of claim 7, wherein the metadata includes a status of a build of the job.

9. The method of claim 8, wherein the status of the build indicates whether the job failed or succeeded based on the execution of the job.

10. The method of claim 1, further comprising:
    determining whether the log file is in a compressed format, wherein extracting the plurality of files includes in response to a determination that the log file is in the compressed format, decompressing the log file.

11. The method of claim 1, wherein the first format of the log file is different from a second format of a file of the plurality of files.

12. A system for storing test results, comprising:
    a memory containing machine readable medium storing machine executable code; and
    one or more processors coupled to the memory and configurable to execute the machine executable code to cause the one or more processors to:
    execute a job;
    store a test result of the job into a log file;
    receive from a test execution server a notification that the job has completed execution in the test execution server, wherein the notification includes an identifier and a name of the job;
    retrieve, based on the identifier and the name of the job, a log file from the test execution server, wherein the log file includes a plurality of files storing a set of test results based on the execution of the job, and the log file is in a format different from at least one file of the plurality of files;
    extract, based on the format of the log file, a first set of text files from the log file;
    extract, based on the format of the log file, a second set of files from the log file, the second set of files being different from text files; and
    store the first set of text files, but not the second set of files, into a searchable repository that provides a full-text search; and
    log the first set of text files into a log report, the log report specifying files that have been stored into the searchable repository.

13. The system of claim 12, wherein the one or more processors are configurable to execute the machine executable code to cause the one or more processors to:
expose the log file through a Web browser, wherein the test execution server is a Web server.

14. The system of claim 12, wherein the one or more processors are configurable to execute the machine executable code to cause the one or more processors to:
store a link associated with the job into a search server;
display the link on a display coupled to the system; and
in response to a selection of the link, retrieving the plurality of files from the search server.

15. The system of claim 12, wherein the log file is not of a text file format.

16. The system of claim 15, wherein the one or more processors are configurable to execute the machine executable code to cause the one or more processors to:
receive from an extraction module a request for the log file associated with the identifier and the name of the job; and
in response to a request, provide the log file to the extraction module.

17. The system of claim 12, wherein the notification includes an identifier of the test execution server.

18. The system of claim 12, wherein the format is a tarball, gzip, zip format, lxz, or bzip2 format.

19. The system of claim 12, wherein the one or more processors are configurable to execute the machine executable code to cause the one or more processors to:
parse the log file;
collect metadata on a file of the plurality of files; and
store the metadata corresponding to the file into a search server.

20. A non-transitory machine-readable medium comprising a plurality of machine-readable instructions that when executed by one or more processors is adapted to cause the one or more processors to perform a method comprising:
receiving a notification that a job has completed execution in a test execution server, the notification including an identifier and a name of the job, and the notification being sent from the test execution server;
retrieving, based on the identifier and the name of the job, a log file from the test execution server, the log file including a plurality of files storing a set of test results based on the execution of the job, and the log file being in a format different from at least one file of the plurality of files;
extracting, based on the format of the log file, a first set of text files from the log file;
extracting, based on the format of the log file, a second set of files from the log file, the second set of files being different from text files;
storing the first set of text files, but not the second set of files, into a searchable repository that provides a full-text search; and
logging the first set of text files into a log report, the log report specifying files that have been stored into the searchable repository.

* * * * *